Dec. 2, 1969     S. R. HOWARTH     3,481,179

APPARATUS FOR THE DETECTION OF GASES

Filed April 3, 1967     2 Sheets-Sheet 2

Inventor
Stephen Roland Howarth
By
Cushman, Darby & Cushman
Attorneys

United States Patent Office 3,481,179
Patented Dec. 2, 1969

3,481,179
APPARATUS FOR THE DETECTION OF GASES
Stephen Roland Howarth, Sheffield, England, assignor to National Research Development Corporation, London, England
Filed Apr. 3, 1967, Ser. No. 627,911
Claims priority, application Great Britain, Apr. 4, 1966, 14,821/66
Int. Cl. G01n 31/00
U.S. Cl. 73—27                    12 Claims

ABSTRACT OF THE DISCLOSURE

An apparatus for detecting gases, in which the gas detecting element is contained within a chamber across the entrance to which is carried a diffuser through which in one mode of operation, gas from the surrounding atmosphere can enter the chamber. A nozzle is included so that, in a second mode of operation, a curtain of gas from a specific sample or remote point can be produced across the diffuser to exclude gas from the surrounding atmosphere so that substantially only gas from the curtain will enter the chamber.

---

The invention relates to improvements in or connected with apparatus for detection of gases. The detection of potentially dangerous gases in industrial atmospheres has been effected by measuring electrically the thermal effects of a gas on a body containing a catalyst sensitive to such gas, the thermal effect being a well defined function of the concentration of the gas in the atmosphere coming in contact with the body. The apparatus for such purposes has usually been bulky and heavy and has required a power supply to enable a sample of the atmosphere to be pumped through the detecting apparatus. Apparatus according to the present invention has the advantage, by novel construction, of allowing pump and power supply to be dispensed with. This not only reduces weight but reduces the voltage and power requirements of the apparatus to that of one or two dry cells, suitable for operating a resistance bridge and galvanometer, a reduction which can be a useful safety feature in work in atmospheres containing combustible gases, possibly in proportions of explosive mixture. The apparatus according to the present invention is particularly applicable to the detection of combustible gases, e.g. methane, in the atmosphere in mines.

According to the invention, an apparatus for the purpose just described comprises a gas detecting element within a chamber into which, in one mode of operation, gas can pass from the surrounding atmosphere through a diffuser, and is provided with nozzle-means permitting a second mode of operation by projecting a curtain of gas, other than from the surrounding atmosphere, across the outer face of the diffuser, thereby substantially to exclude gas from the surrounding atmosphere so that only gas from this curtain can pass through the diffuser and into the chamber.

The nozzle-means may be in the form of an annular slot surrounding the diffuser so as to direct the curtain of gas over this, and it may comprise a sintered ring arranged to give entry to the slot and provide an evenly distributed flow of this gas into and from the slot.

In order to prevent disturbances in the surrounding atmosphere adversely affecting the formation of the curtain across the outer face of the diffuser a second diffuser may be provided which is in spaced relationship to the first diffuser and disposed between this and the surrounding atmosphere.

The detecting element may be of any suitable known kind, for example an electrically heatable catalytically acting element which varies its resistance or electrical output with changes of temperature, and with which it is fairly common practice to employ a non-catalytic compensating element. In a usual arrangement, the detecting element is connected into one arm of a suitable bridge circuit and a compensating element is connected into another arm of this circuit. The compensating element may be contained in a common chamber with the detecting element or it may be disposed separately from this at a suitable point where it will be subjected to the required conditions.

Examples of gas detection apparatus according to this invention will now be described with reference to the accompanying drawings, of which:

Figure 1:
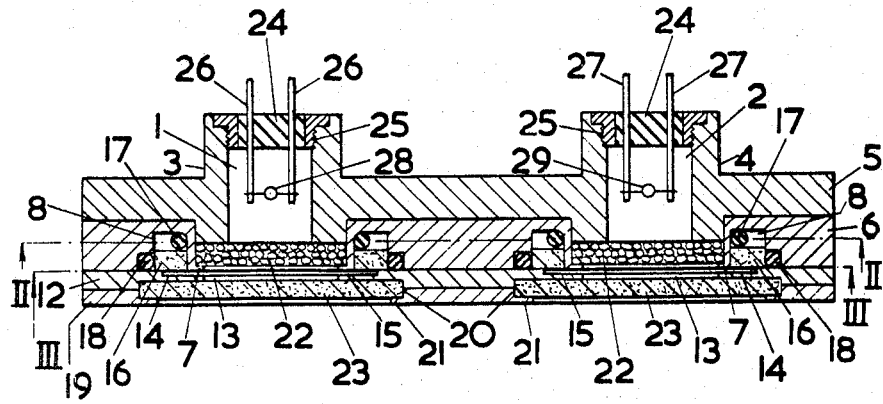
FIG. 1 is a vertical section showing one embodiment of the invention.
Figure 2:
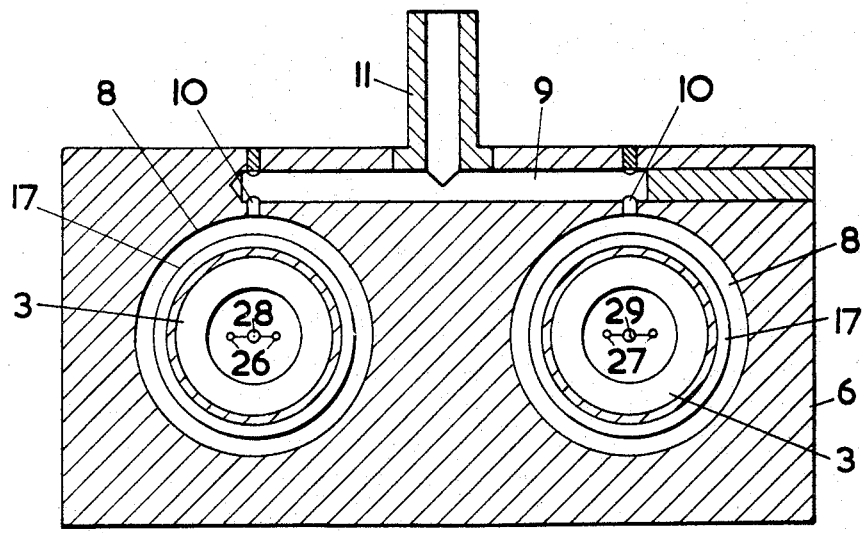
FIG. 2 is a sectional plan on line II—II FIG. 1.
Figure 3:
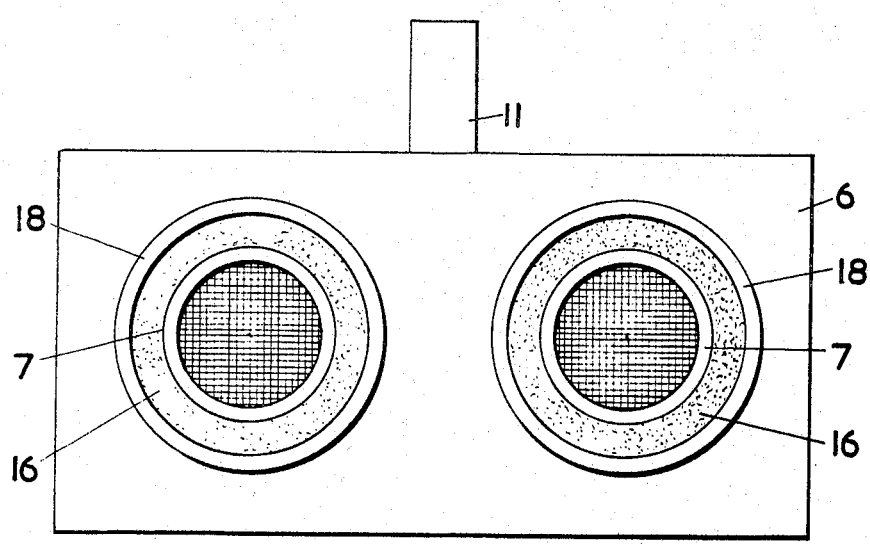
FIG. 3 is a similar plan on line III—III FIG. 1.

In the construction shown in FIGS. 1 to 3, two chambers 1 and 2, are formed in cylindrical portions 3, 4, respectively, which are formed integrally with a plate 5. The part of each cylindrical portion which projects from the lower side of the plate 5 is of larger external diameter than that projecting from the other side of this plate and forms a machined fit in the upper half of a perforation within a plate 6 fixed to the plate 5. The lower end of this perforation is provided with an inwardly directed flange 7. Formed within the plate 6 and concentrically with each of the said perforations therein is a rectangular channel 8 which opens at the lower face of the plate 6, and drilled in the plate 6 is a duct 9, as shown in FIG. 2, which duct is at each of its ends connected by a short passage 10 to the adjacent channel 8 and at its mid point is connected to a nipple 11 which is fixed into and protrudes from the edge of the plate 6.

Fixed to the underside of the plate 6 is a plate 12 which is bored through to form perforations 13, 13, which are coaxial with the respective chamber 1, 2. The upper face of the part of the plate 12 immediately surrounding each perforation 13 is slightly undercut to form a shallow circular recess 14 concentric with the perforation and of a diameter slightly less than the outer diameter of the rectangular channel 8, this part of the bore of the perforation 13 being of considerably smaller diamerer than the remainder of the bore. The shallow recess just referred to forms an annular horizontal slot 15 between itself and the lower end of the inner wall of the channel 8, the flange 7 and a sintered bronze ring 16 within the channel and sealed therein by O-rings 17 and 18, the latter being contained within a recess formed at the lower end of the outer wall of the channel.

Fixed upon the underside of the plate 6 is a plate 19 which is bored to form perforations 20, 20, coaxial with the perforations 13, 13, and of a diameter equal to the maximum diameter bore portions of these perforations. Provided around the lower end of each perforation 20 is a flange 21.

Carried between the lower end of each of the cylindrical bodies 3 and 4 and the adjacent flange 7 is a diffuser 22 comprised of a layer of charcoal. Contained jointly by and fitting within the lower bore portion of each of the perforations 13 and the bore of the adjacent perforation 20 in the plate 19 is a second diffuser 23 which is retained in position by the flange 21.

Carried by insulating material 24 which seals the bore of a ring 25 screwed into the upper end of each of the chambers 1 and 2 is a pair of lead-in wires, those lead-in wires which are carried within the ring 25 being numbered 26, 26, and those carried within the other ring 25 being numbered 27, 27.

Connected between the lower ends of the lead-in wires 26, 26, is a detecting element 28 which may be of any suitable known kind, for example an electrically heatable catalytically acting element which varies its resistance or electrical output with changes of temperature, and there is connected between the lower ends of the lead-in wires 27, 27, a non-catalytic compensating element 29.

In the first mode of operation of the apparatus, gas from the surrounding atmosphere passes into the respective chambers 1, 2, through the appropriate diffusers 23 and 22, but, in the second mode of operation, gas from a rubber bag or other suitable container is injected into the nipple 11 from where it passes into a duct 9, through passages 10 into the channels 8, through the sintered rings 16 and then through the horizontal annular slots 15 to form a curtain across the face of each of the diffusers 22, from which curtain some of the gas will pass through these diffusers 22 into the respective chambers 1, 2. Each annular horizontal slot 15 thus constitutes an annular nozzle.

The purpose of the sintered bronze rings 16, 16, is to provide a resistance to the flow of injected gas into the second mode of operations so that the pressure rises sufficiently in the lower part of each of the recesses 8 to produce a fairly evenly distributed radial flow of the gas to be sampled. The sintered bronze rings may be of porosity Grade No. 4 (BS1752 of 1963) and, say of a thickness of 1.5 mm. (1/16 inch). The undercut portions 14 may, for example, be of a depth of 0.25 mm.

Figure 4:
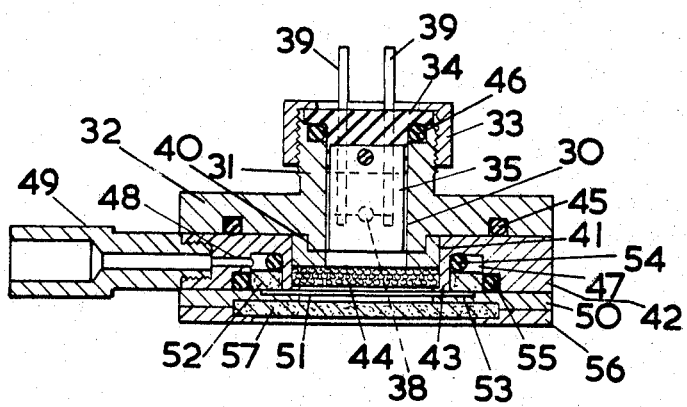
FIG. 4 is a vertical section showing an alternative embodiment of the invention.
Figure 5:
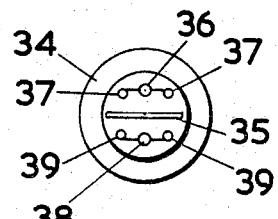
FIG. 5 is a plan showing more clearly the electrode arrangement of the embodiment shown in FIG. 4.

In FIG. 4 is shown a preferred construction of the apparatus which uses only one chamber and is therefore more compact and simple to manufacture. In this construction, the chamber, which is indicated by the reference numeral 30, is formed within a cylindrical body 31 which is integral with a circular plate 32, the exterior of the upper portion of which body 31 is screw-threaded to receive a cap 33 which secures in position an electrode mount 34 which carries a downwardly extending partition 35 which in effect divides the chamber into two parts one of which contains a detector element 36 carried at the inner end of a pair of lead-in wires 37, 37, and the other part contains a compensating element 38 carried by lead-in wires 39, 39. The electrode mount 34 is made of a thermo-setting resin or other suitable insulating material.

Fitted onto the lower end of the cylindrical body 31 is a spacer element 40 which fits into the upper part of a central perforation 41 in a circular plate 42, at the lower end of which perforation 41 is an inwardly directed flange 43 between which and the spacer element is held a charcoal pad 44 which constitutes a diffuser.

The plate 32 is secured to the plate 42 by screws (not shown), the plate 32 having in its underside a recess carrying an O-ring 45 which seals against the upper surface of the plate 42. The upper end of the cylindrical body is undercut around the top of the chamber 30 and carries within this undercut portion an O-ring 46 which seals against the upper part of the electrode mount 34.

Provided within the underside of the plate 42, concentrically with the perforation 41, is a rectangular channel 47 connected with the upper part of which is a passage 48 which communicates with an inlet tube 49 screwed into the edge of the plate 42.

Secured by screws (not shown) to the underside of the plate 42 is a circular plate 50 provided with a central bore 51 which is coaxial with the chamber 30 and the diameter of the upper part of which bore is the same as the internal diameter of the flange 43, whereas the diameter of the lower half of this bore is considerably greater. Immediately around the upper end of the bore 51 of the plate 50, a shallow undercut is machined in the surface of this plate to a diameter slightly less than the outer diameter of the channel 47, so that this undercut portion, together with the lower end of the inner wall of the channel 47, flange 43 and a sintered bronze ring 52, forms a horizontal annular slot 53 similar to the channels 15 of the construction described with reference to FIG. 1. The inner periphery of the sintered ring 52 is sealed to the channel 47 by an O-ring 54, and the outer peripheral edge of this ring is sealed to the channel by an O-ring 55 contained in a recess formed around the lower end of the outer wall of the channel 47.

Fixed by screws (not shown) to the underside of plate 50 is a ring 56 which holds a second diffuser 57 within the lower part of the bore 51 of this plate. As previously stated, the purpose of this second diffuser, in both this construction and that shown in FIGS. 1, 2 and 3, is to prevent disturbances in the surrounding atmosphere adversely affecting the formation of the curtain across the outer face of the first diffuser or each first diffuser, as the case may be. The second diffuser can also exclude airborne dust from the surrounding atmosphere or act as a flame trap.

What is claimed is:

1. Apparatus for detection of gases comprising a chamber, a detecting element within this chamber, a diffuser arranged so that gas must pass through this diffuser from the surrounding atmosphere in its passage to the chamber, wherein the improvement comprises: means for flowing a film of gas other than from the surrounding atmosphere over a face of said diffuser located farthest from said chamber, said means being located substantially around the periphery of said face of said diffuser, and means for supplying said other gas to said flowing means, whereby a purging or calibrating mode of operation of the apparatus is permitted in which said gas film substantially excludes from said face the gas from said surrounding atmosphere so that only gas from said film will pass through the diffuser into the chamber.

2. Apparatus according to claim 1, comprising a second diffuser disposed exteriorly of and in spaced relationship to the first diffuser so that in one mode of operation all gas passing to the first diffuser must previously pass through this second diffuser, but in another mode of operation the second diffuser will prevent disturbances in the surrounding atmosphere adversely affecting the formation of the said film.

3. Apparatus according to claim 1, wherein the flaming mean comprises a slot (53) which surrounds the diffuser (44) to flow the film of gas over the outer face of this diffuser.

4. Apparatus according to claim 3, comprising a second diffuser (57) disposed exteriorly of and in spaced relationship to the first diffuser (44) so that all gas passing to the first diffuser from the surrounding atmosphere in one mode of operation must previously pass through the second diffuser (57), but in another mode of operation, the said second diffuser will prevent disturbances in the surrounding atmosphere adversely affecting the formation of the said film.

5. Apparatus according to claim 4, comprising a sintered ring arranged to give entry of injected gas to said slot (53) and to provide an evenly distributed flow of this gas into and from the slot.

6. Apparatus according to claim 1, comprising a partition which divides the chamber logitudinally into two parts, a gas detecting element in one of these parts, and a compensating element in the other part, which elements may be connected into the appropriate arms of a resistance bridge.

7. Apparatus according to claim 6, comprising a body (34) of non-conducting material within the end of the chamber (30) remote from the entry end thereof, two pairs of lead-in wires (37, 37 and 39, 39) passing through this body a pair on either side of the partition (35) which is carried by the body, a gas detecting element (36) carried between the inner ends of one pair (37, 37) of the lead-in wires, and a compensating element (38) carried between the inner ends of the other pair (39,39) of the lead-in wires.

8. Apparatus for the detection of gasses comprising first and second chambers, a detecting element within said first chamber, a compensating element within said second chamber, a diffuser arranged at the entry to each of the chambers so that gas must pass through these diffusers from the surrounding atmosphere in its passage to the chambers, wherein the improvement comprises: means for flowing a film of gas other than from the surrounding atmosphere over a face of each of said diffusers located farthest from said chambers, said means being located substantially around the periphery of each of said faces of said diffusers, and means for supplying said other gas to said flowing means, whereby a purging or calibrating mode of operation is permitted in which said gas film substantially excludes from said faces the gas from said surrounding atmosphere so that only gas from said film will pass through the diffusers into the chambers.

9. Apparatus according to claim 8, comprising a second diffuser disposed exteriorly of and in spaced relationship to each of the first diffusers so that, in one mode of operation, all gas passing to these first diffusers from the surrounding atmosphere must pass through the second diffusers, but, in another mode of operation, the second diffusers will prevent disturbances in the surrounding atmosphere adversely affecting the formation of the said film.

10. Apparatus according to claim 8, wherein the flowing means comprises a slot (15) which surrounds each diffuser (22, 22) to produce the film of gas over the outer face thereof.

11. Apparatus according to claim 10, comprising a porous ring (16) to give entry of injected gas to each annular slot (15) and to provide an evenly distributed flow of gas into and from the flowing means.

12. Apparatus according to claim 11, comprising a second diffuser (23) disposed exteriorly of and in spaced relationship to each of the first diffusers (22, 22) so that, in one mode of operation all gas passing to these first diffusers from the surrounding atmosphere must pass through the second diffusers, but, in another mode of operation, the second diffusers will prevent disturbances in the surrounding atmosphere adversely affecting the formation of the said film.

References Cited

UNITED STATES PATENTS

| | | | |
|---|---|---|---|
| 960,823 | 6/1910 | Clark | 340—237 |
| 1,645,404 | 10/1927 | Ringrose | 340—237 |
| 3,097,520 | 7/1963 | W. R. Thompson | 73—27 |

FOREIGN PATENTS

| | | |
|---|---|---|
| 740,436 | 11/1952 | Canada. |

RICHARD C. QUEISSER, Primary Examiner

C. E. SNEE, Assistant Examiner

UNITED STATES PATENT OFFICE
CERTIFICATE OF CORRECTION

Patent No. 3,481,179             Dated December 2, 1969

Inventor(s) Stephen Roland Howarth

It is certified that error appears in the above-identified patent and that said Letters Patent are hereby corrected as shown below:

In Column 4, Claim 3, lines 45 and 46, cancel "flaming mean" and substitute therefor -- flowing means --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents